(12) United States Patent
Peera et al.

(10) Patent No.: US 8,552,072 B2
(45) Date of Patent: Oct. 8, 2013

(54) DIAMINO-ALCOHOL COMPOUNDS, THEIR MANUFACTURE AND USE IN HIGH SOLIDS MINERAL SLURRIES

(75) Inventors: Asghar Peera, Buffalo Grove, IL (US); Ian Tomilnson, Midland, MI (US); Glen Robinson, Naperville, IL (US)

(73) Assignees: Dow Global Technologies LLC, Midland, MI (US); Angus Chemical Company, Buffalo Grove, IL (US)

( * ) Notice: Subject to any disclaimer, the term of this patent is extended or adjusted under 35 U.S.C. 154(b) by 407 days.

(21) Appl. No.: 12/928,584

(22) Filed: Dec. 15, 2010

(65) Prior Publication Data

US 2011/0147649 A1    Jun. 23, 2011

Related U.S. Application Data

(60) Provisional application No. 61/284,636, filed on Dec. 22, 2009.

(51) Int. Cl.
| | | |
|---|---|---|
| C09K 3/00 | (2006.01) |
| C09C 1/42 | (2006.01) |
| C04B 14/10 | (2006.01) |
| C04B 24/02 | (2006.01) |
| C04B 28/12 | (2006.01) |
| C04B 33/13 | (2006.01) |
| C07C 215/14 | (2006.01) |
| C07C 215/16 | (2006.01) |
| C07C 213/00 | (2006.01) |
| C07C 209/32 | (2006.01) |
| C07C 209/36 | (2006.01) |

(52) U.S. Cl.
USPC ........... 516/100; 106/632; 106/468; 106/486; 106/487

(58) Field of Classification Search
USPC .................. 516/100; 106/632, 468, 486, 487
See application file for complete search history.

(56) References Cited

U.S. PATENT DOCUMENTS

| | | | | |
|---|---|---|---|---|
| 2,994,660 | A * | 8/1961 | Reddie et al. ................. 507/131 |
| 8,070,044 | B1 * | 12/2011 | Fleming et al. .......... 228/180.21 |
| 8,070,045 | B1 * | 12/2011 | Fleming et al. .......... 228/180.21 |
| 2011/0152401 | A1 * | 6/2011 | Peera et al. .................... 523/122 |
| 2011/0152407 | A1 * | 6/2011 | Peera et al. .................... 523/400 |
| 2011/0152574 | A1 * | 6/2011 | Peera et al. .................... 564/356 |

* cited by examiner

*Primary Examiner* — Daniel S Metzmaier
(74) *Attorney, Agent, or Firm* — Marcella M. Bodner

(57) ABSTRACT

A new class of compounds, namely diamino alcohols, is described, along with a process for their production and their use as rheology modifiers in high solids mineral slurries, such as, kaolin clay slurries.

7 Claims, No Drawings

DIAMINO-ALCOHOL COMPOUNDS, THEIR MANUFACTURE AND USE IN HIGH SOLIDS MINERAL SLURRIES

This application claims the benefit of priority under 35 U.S.C. §119(e) of U.S. Provisional Patent Application No. 61/284,636 filed on Dec. 22, 2009.

FIELD OF THE INVENTION

The present invention relates to a new class of compounds, namely diamino-alcohols, a process for producing same, and their use as rheology modifiers in high solids mineral slurries.

BACKGROUND OF THE INVENTION

Simple amine compounds are known to provide neutralizing, dispersant and hardening properties when added to coatings, mineral slurries and epoxy formulations. Methods for simple amine compound manufacture are well-documented and known in the art, and when the goal is to prepare primary amines, the preferred routes often involve intermediate nitro alcohol compounds. For various reasons, it would be advantageous to have compounds with more than one amino group and low volatile organic compound ("VOC") content.

Volatile organic compounds are organic chemical compounds that have high enough vapor pressures under normal conditions (i.e., 1 atmosphere and 25° C.) to significantly vaporize and enter the atmosphere. They include a variety of chemicals, many of which have adverse health effects, and are emitted by a wide variety of products including but not limited to: paints and lacquers, paint strippers, cleaning supplies, pesticides, building materials and furnishings, office equipment such as copiers and printers, correction fluids and carbonless copy paper, graphics and craft materials including glues and adhesives, permanent markers, and photographic solutions. Minimization of VOC content has become the focus of public attention as well as government regulation.

Processes for the manufacture of the intermediate nitro alcohol compounds, are known and typically involve nitro aldol reaction (Henry Reaction) between nitroalkanes and aldehydes. There has been occasional reference to the preparation of dinitro alcohols involving a tandem Michael addition and Henry reaction of a nitroalkane with an α,β-unsaturated aldehyde. For example, see "Secondary dinitro alcohols," Smith, Curtis W. (Shell Development Co.) 1949, and U.S. Pat. No. 2,475,996, which describe the manufacture of the nitro alcohol 2,5,6-trimethyl-2,6-dinitro-3-heptanol. This nitro alcohol is also prepared as an intermediate to making a vasopeptidase inhibitor, as discussed in Efficient Asymmetric Synthesis of the Vasopeptidase Inhibitor BMS-189921 by Janak Singh et al., Org. Lett. (2003), 5, 17, 3155-3158. In addition, manufacture of the nitro alcohol compound 2,6-dinitro-5-phenyl-heptan-3-ol has been described in David St. Clair Black et. al. Australian Journal of Chemistry, 1976, 29(11), 2511. As is also well-established, nitro alcohol compounds may be readily converted to the aminoalcohol compounds by hydrogenation with hydrogen over a suitable catalyst, for example Raney nickel or a platinum- or palladium-based catalyst (Pt or Pd in elemental form or as oxides, with or without supports, e.g., carbon). Those skilled in the art are also aware that other reducing agents which will reduce nitroalkanes to primary amines include metal/acid combinations, e.g., iron/acetic acid; and aluminum hydrides. The preferred reducing agents include hydrogen gas in combination with any of the following catalysts: Raney nickel, platinum or palladium.

Diamino alcohol compounds and their uses, on the other hand, are not currently represented in the prior art.

The diamino alcohol compounds described herein will perform excellently as dispersants in mineral slurry systems, particularly in aqueous kaolin clay slurries having high solids content (i.e., greater than 50 weight % solids) while maintaining fluidity necessary for handling. Calcined kaolin is an anhydrous aluminium silicate produced by calcining (heating) ultrafine natural kaolin material to high temperatures (700° C.-1000° C.) in a kiln. The calcination process increases whiteness and hardness, improves electrical properties, and alters the size and shape of the kaolin particles. Calcined kaolin is useful for improving the thermal properties of agricultural films, improving the electrical performance of poly(vinyl)chloride cable, providing a functional filler in thermoplastic materials, and as an additive to impart opacity to paints.

To date, polyacrylate salts have been employed as dispersing agents in mineral slurries, such as kaolin clays, to impart fluidity since the system will not flow in the absence of a dispersing agent. Polyacrylate salts have good handling and safety characteristics, but only allow for limited dispersive capabilities as the content of solids in the system is increased. Simple diamines such as ethylenediamine have rheological limitations when higher solids loadings are encountered, while longer-chain diamines become highly colored and have a very offensive odor. Simple amino alcohols, such as 2-amino-2-methyl-1-propanol (AMP), do not have a high degree of adsorption to the surface of calcined clay, and have low efficiency as surface treatments or sole dispersants. There is a need for new dispersing agents that can provide aqueous kaolin clay slurries (preferably calcined kaolin clay slurries) having high solids (>50% solids). It is another object of this invention to provide higher solid aqueous calcined clay slurries that are sufficiently fluid and do not require multiple dispersant technologies that do not achieve the desired level of fluidity at increased solids loading.

SUMMARY OF THE INVENTION

The present invention provides a mineral slurry comprising: (a) 40 to 55% by weight water; (b) 45 to 58% by weight of a solid particulate clay material; and (c) up to 2% by weight of a diamino alcohol compound having the formula:

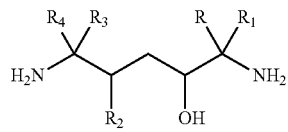

wherein R is independently hydrogen, alkyl, aryl, or —CH$_2$OH; R$_1$ is independently hydrogen, alkyl, or —CH$_2$OH; alternatively, R and R$_1$ may be linked together to form a cycloalkyl; R$_2$ is independently hydrogen, methyl, alkyl, phenyl or substituted phenyl; R$_3$ is independently hydrogen, alkyl, phenyl or substituted phenyl, or —CH$_2$OH; R$_4$ is independently hydrogen, alkyl, or —CH$_2$OH; and alternatively, R$_3$ and R$_4$ may be linked together to form a cycloalkyl; wherein all weight percents are based on the total weight of the mineral slurry.

The solid particulate clay material may comprise clay, for example, without limitation kaolin clay.

DETAILED DESCRIPTION OF THE INVENTION

A new and useful class of amino compound, namely diamino alcohols, has been discovered, along with processes for their manufacture. These compounds are produced by tandem Michael and Henry reaction of nitroalkanes with one or more α,β-unsaturated aldehydes and, optionally, post reacted with an aldehyde such as formaldehyde. As a result, the diamino alcohol compounds produced have primary amine groups, preferably bonded to tertiary carbon atoms, with low content of volatile organic compounds (VOCs). They may be represented by the following formula:

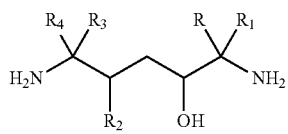

wherein R is independently hydrogen, alkyl, aryl, or —CH$_2$OH; R$_1$ is independently hydrogen, alkyl, or —CH$_2$OH; alternatively, R and R$_1$ may be linked together to form a cycloalkyl; R$_2$ is independently hydrogen, methyl, alkyl, phenyl or substituted phenyl; R$_3$ is independently hydrogen, alkyl, phenyl or substituted phenyl, or —CH$_2$OH; R$_4$ is independently hydrogen, alkyl, or —CH$_2$OH; and alternatively, R$_3$ and R$_4$ may be linked together to form a cycloalkyl.

The foregoing category of diamino alcohols includes various degrees of poly-alcohols ("polyols") as well as simple diamino mono-alcohols. The simpler diamino mono-alcohols would have the following formula:

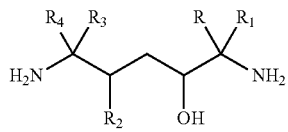

wherein R is independently hydrogen, alkyl, phenyl or substituted phenyl; R$_1$ is independently hydrogen or alkyl; alternatively, R and R$_1$ may be linked together to form a cycloalkyl; R$_2$ is independently hydrogen, alkyl, or phenyl or substituted phenyl; R$_3$ is independently hydrogen, alkyl, or aryl; R$_4$ is independently hydrogen or alkyl; and alternatively, R$_3$ and R$_4$ may be linked together to form a cycloalkyl.

The diamino mono-alcohols of the present invention may be produced by reaction of a nitroalkane and an α,β-unsaturated aldehyde which produces an intermediate dinitro alcohol compound. This reaction is typically operated at temperatures between 0° C. and 100° C. under atmospheric pressure, for example, without limitation between 0° C. and 50° C. Applicants have surprisingly and conveniently found that this reaction proceeds sequentially with Michael addition of nitroalkane to the olefin occurring first, followed by aldol (Henry) reaction in which the second nitroalkane is added to the aldehyde, to produce a single species of dinitro mono-alcohol intermediate.

The nitroalkane may be a primary or secondary nitroalkane having the formula:

wherein R is hydrogen, R$^1$ is hydrogen, alkyl, phenyl or substituted phenyl; or wherein R is alkyl, phenyl, or substituted phenyl, and R$^1$ is alkyl, or R and R$^1$ may be linked together to form a cycloalkyl. For example, without limitation, nitromethane, nitroethane, 2-nitropropane, nitrocyclohexane etc. are all suitable nitroalkanes for use as starting materials to prepare the diamino alcohol compounds in accordance with the present invention. More particularly, the primary or secondary nitroalkane may be a C$_1$-C$_{20}$ nitroalkane, a C$_1$-C$_{10}$ nitroalkane, or even a C$_2$-C$_6$ nitroalkane.

Suitable α,β-unsaturated aldehydes have the following formula:

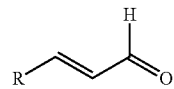

wherein R is hydrogen, methyl(alkyl), phenyl, or substituted phenyl. Suitable unsaturated aldehydes include, but are not limited to, acrolein, crotonaldehyde, cinnamaldehyde, derivatives of cinnamaldehyde substituted at the aromatic ring, etc.

The foregoing sequential Michael-Henry reaction between the nitroalkane and unsaturated aldehyde occurs in the presence of a suitable catalyst including, but not limited to, organic bases such as 1,8-Diazabicyclo[5.4.0]undec-7-ene ("DBU"), 2-dimethylamino-2-methyl-1-propanol ("DMAMP"), trimethylamine (TMA), dimethylisopropylamine (DMIPA), N,N,N',N'-tetramethylguanidine (TMG), Verkade's base, etc. Alternatively, inorganic bases such as potassium carbonate, and sodium hydroxide may also be used as catalysts for the sequential Michael-Henry reaction described above.

The starting materials are provided at a molar ratio of nitroalkane to aldehyde of typically 2:1. The reaction may be performed with or without a solvent, according to the preference of the practitioner. Suitable solvents include but are not limited to tetrahydrofuran, 2-methyltetrahydrofuran, dioxane.

Where the desired product is a diamino poly-alcohol compound, the (1) nitroalkane is a primary nitroalkane and the process for production of the diamino poly-alcohol compound further comprises, after reacting the (1) primary nitroalkane and (2) α,β-unsaturated aldehyde, but prior to reducing the resulting nitro alcohol, further reacting the resulting nitro alcohol with (3) an aldehyde, such as formaldehyde, to form a dinitro poly-alcohol compound, which is then further reduced under hydrogenation conditions and in the presence of a catalyst.

More particularly, the production of diamino poly-alcohol (polyol) compounds proceeds as follows: (A) reacting (1) a primary nitroalkane and (2) an α,β-unsaturated aldehyde to form a dinitroalcohol; (B) further reacting the dinitroalcohol with (3) an aldehyde, such as formaldehyde, to form a dinitro poly-alcohol (e.g., a dintro-dialcohol or dinitro-trialcohol) product; and (C) then further reducing the dinitro poly-alcohol product to the corresponding diamino poly-alcohol product under hydrogenation conditions, in the presence of a catalyst. The reaction is performed under conditions in which the Michael addition of the nitroalkane occurs more rapidly than the Henry reaction (i.e., temperatures between 0° C. and 100° C. under atmospheric pressure, for example, without limitation, between 0° C. and 50° C.), allowing for the sequential reactions to produce the dinitro poly-alcohol. The (1) nitroalkane and the (2) aldehyde are provided at a molar ratio of 2:1 during the first reaction step which produces the dinitro alcohol. The primary nitroalkane may be a primary $C_1$-$C_{20}$ nitroalkane, for example, without limitation, a primary $C_1$-$C_{10}$ nitroalkane. The α,β-unsaturated aldehyde may be selected from the group consisting of: acrolein, crotonaldehyde, cinnamaldehyde, and derivatives of cinnamaldehyde substituted at the aromatic ring.

The subsequent reaction of the dinitro alcohol with a second aldehyde, such as formaldehyde, occurs after the completion of the reaction to form the nitro alcohol has been confirmed (e.g., such as by analytical methods known to persons of ordinary skill in the art including, but not limited to, gas chromatography or high-performance liquid chromatography). The ratio of the formaldehyde to the dinitro alcohol is typically 2:1 for this sequential reaction step. Again, this reaction may be performed with or without a solvent, according to the preference of the practitioner, such as, without limitation, tetrahydrofuran, 2-methyltetrahydrofuran, dioxane.

The intermediate dinitro alcohol compound produced by either of the above-described sequential Michael-Henry reactions has the following formula:

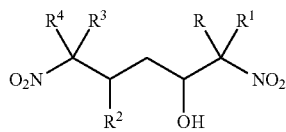

wherein R is independently hydrogen, alkyl, aryl, or —$CH_2OH$; $R^1$ is independently hydrogen, alkyl, or —$CH_2OH$; alternatively, R and $R^1$ may be linked together to form a cycloalkyl; $R^2$ is independently hydrogen, methyl, alkyl, phenyl or substituted phenyl; $R^3$ is independently hydrogen, alkyl, aryl, or —$CH_2OH$; $R^4$ is independently hydrogen, alkyl, or —$CH_2OH$; and alternatively, $R^3$ and $R^4$ may be linked together to form a cycloalkyl.

In a particular embodiment, the nitroalkane is 2-nitropropane and the α,β-unsaturated aldehyde is either crotonaldehyde or cinnamaldehyde, which would produce a dinitro mono-alcohol compound.

The dinitro alcohol intermediate, whether mono- or polyalcohol, is then further reduced under hydrogenation conditions in the presence of a suitable catalyst to produce the desired diamino alcohol comprising two amino groups, each of which is bonded to a tertiary carbon atom. Suitable dehydrogenation catalysts include, without limitation, Raney nickel, or a platinum- or palladium-based catalyst, (e.g., platinum or palladium in elemental form or as oxides, with or without supports, e.g., carbon). Other suitable reducing agents include, without limitation, metal/acid combinations, e.g., iron/acetic acid; and aluminum hydrides. An example of a dehydrogenation catalyst system suitable for use in accordance with the present invention is hydrogen gas in combination with any of Raney nickel, platinum or palladium.

The hydrogenation of dinitro alcohol to produce the diaminoalcohol may be performed at pressures between 100 and 1000 pounds per square inch ("psi") and temperatures between 30° C. and 100° C. A solvent may be used, such as, without limitation, tetrahydrofuran or methanol.

The resulting diamino alcohol compounds provide improved characteristics when used as dispersants in mineral slurries, such as clay slurries. For example, the novel diamino alcohol compounds of the present invention are effective dispersing agents for kaolin clay slurries, particularly calcined kaolin clay slurries. These previously unknown multifunctional amino-alcohols are low VOC and low odor, and when applied as dispersing agents for calcined clays, these materials afford dispersive capabilities which allow for improved solids loadings of aqueous slurries while maintaining desirable fluidity at the increased solids levels, without the application of additional dispersant technologies.

Calcined kaolin-containing clay is typically obtained by heating a hydrous kaolin-containing clay, in a kiln or similar apparatus. Typically full calcination occurs at temperatures near or greater than 900° C. The kaolin-containing clay may include, without limitation, any kaolin clay, crude, processed or partially processed. For example, the kaolin clay can be a crude kaolin clay, whole or partially. Furthermore, the crude clay may comprise grey clay, or cream clay, and thus, the crude clay can be a combination of clays, and it may be a hard or soft clay. The crude clay may contain organic matter (i.e., grey crude) or it may substantially lack organic matter (i.e., cream, tan, brown, or red crudes). Other materials may also be present in the hydrous kaolin-containing clay, such as one or more of silica, crystalline silica, or any other material, compound, or composition found or used in ceramic body material.

Additionally, the kaolin used in any of the claimed methods can be a fractionated clay, having a particle size distribution that has been modified or aggregated, such as by mechanical methods or by alternative methods such as chemical fractionation or aggregation, which methods are all known in the art. Fractionation can be performed at any desired step in the method, such as prior to or after calcining the kaolin-containing clay.

Additionally, the clay (or crude), kaolin or other clay, can be ground, e.g., delaminated to modify its particle size and/or shape. Delamination methods are well known in the art. Additionally, modification of a resultant at least partially calcined kaolin can be made, by for example, grinding. Grinding procedures are well known in the art, and can include, for example, mechanical grinding or attrition grinding.

In accordance with one embodiment of the present invention, calcined clay pigment, in its dry form, may be surface treated by the addition of up to 2% by weight of the diamino alcohol compounds, based on the total weight of the clay pigment, in a simple mechanical mixing operation. Alternatively, the dry calcined clay pigment may be surface treated by any means generally known or developed by persons of ordinary skill in the art (e.g., spray drying, blending, etc.). The treated calcined clay is then added to water under agitation to form a slurry, which may then be used in any number of applications including but not limited to coatings and paint formulations, formation of casting slips, paper fillers and plastics additives.

A mineral slurry in accordance with one embodiment of the present invention comprises (a) 40 to 55% by weight water; (b) 45 to 58% by weight of a solid particulate clay material; and (c) up to 2% by weight of a diamino-alcohol compound having the formula:

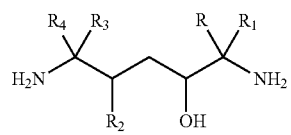

wherein R is independently hydrogen, alkyl, aryl, or —$CH_2OH$; $R_1$ is independently hydrogen, alkyl, or —$CH_2OH$; alternatively, R and $R_1$ may be linked together to form a cycloalkyl; $R_2$ is independently hydrogen, methyl, alkyl, phenyl or substituted phenyl; $R_3$ is independently hydrogen, alkyl, phenyl or substituted phenyl, or —$CH_2OH$; $R_4$ is independently hydrogen, alkyl, or —$CH_2OH$; and alternatively, $R_3$ and $R_4$ may be linked together to form a cycloalkyl;
wherein all weight percents are based on the total weight of the mineral slurry.

The solid particulate material may comprise clay, such as, without limitation, kaolin clay, crude or uncalcined, colored or not.

Another embodiment of the present invention is a method for preparing a mineral slurry having greater than 50% by weight solids content, based on the total weight of the mineral slurry comprising combining (a) 40 to 55% by weight water; (b) 45 to 58% by weight of a solid particulate clay material; and (c) up to 2% by weight of the above-described novel diamino alcohol compound.

EXAMPLES

Example 1

Synthesis of 2,5,6-trimethyl-2,6-dinitroheptan-3-ol (dinitro alcohol intermediate)

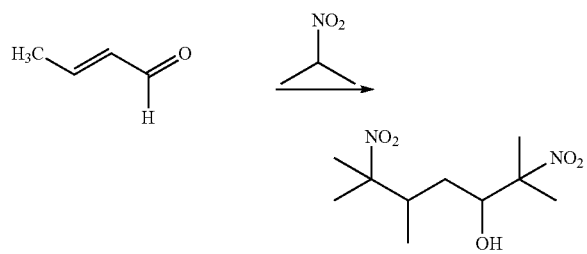

A three neck round bottom flask equipped with a stir bar, thermocouple, dropping funnel capped with nitrogen inlet and condenser was charged with 2-nitropropane ("2-NP") (50 g, 0.56 mots, 5.0 equivalents) and catalytic amount of DBU. The yellow solution was mixed under nitrogen for about thirty minutes. To this mixture was added crotonaldehyde (7.9 g, 9.2 mL, 0.112 moles, 1.0 equivalent) drop-wise over a period of twenty minutes. The addition of crotonaldehyde was done at three different conditions, as follows, and all of them yielded the same results.
Conditions:
(a). Add crotonaldehyde to the 2-NP/DBU mixture which is at −30° C. and warm to room temperature. (b). Add crotonaldehyde to the 2-NP/DBU mixture which is at 20° C. and warm to room temperature. (c). Add crotonaldehyde to the 2-NP/DBU mixture which is at room temperature.

In each case, after complete addition, the reaction was stirred for approximately 5-6 hours at room temperature. During this time, white solid crashed out of the solution. At this point, GC analysis showed the absence of any crotonaldehyde in the reaction mixture. After letting the reaction mixture stir overnight at room temperature and under nitrogen, the white solid was vacuum filtered from the solution and the solid washed thoroughly with water. The solid was air dried, followed by vacuum drying, at 45° C. The total yield of the desired nitro alcohol was 72% (27.8 g). Nuclear magnetic resonance testing ("NMR") and liquid chromatography (LC) showed that the product was >99% pure.

$^{13}C$ NMR (CDCl$_3$): ∂ 14.1, 20.7, 22.5, 23.1, 23.6, 33.5, 37.9, 73.1, 91.8 and 92.1 ppm.

Synthesis of 2,6-diamino-2,5,6-trimethylheptan-3-ol (diamino alcohol)

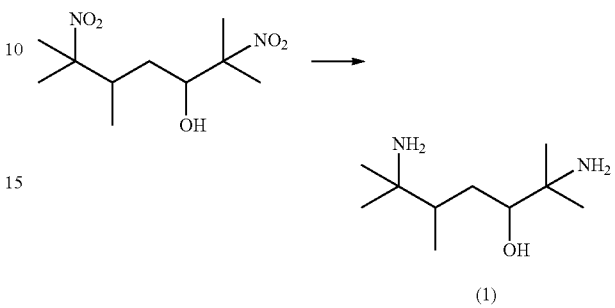

(1)

25 g of the nitro alcohol above was dissolved in 200 mL methanol and hydrogenated under in the autoclave at 60° C. using 14.2 g RaNi 3111 as a catalyst and at 600 psi pressure. After workup which included filtration of the catalyst and removal of methanol, approximately 11 g (59% yield) of the low viscous pale green/colorless liquid was obtained. NMR and gas chromatograph-mass spectroscopy ("GC-MS") analysis confirmed the presence of the desired amino alcohol. chemical ionization mass spectroscopy (CI-MS) showed [M+H]=189 and GC showed that purity of the material to be 94%. The boiling point of the material was approximately 125° C.-135° C. at 5.1 torr. The VOC of the material, as determined by modified EPA Method 24, is 40%. The pKa of the amines was 10.12.

$^{13}C$ NMR (CDCl$_3$): ∂ 16.8, 25.2, 27.9, 30.8, 34.7, 42.2, 51.8, 52.8 and 77.3 ppm.

Example 2

Synthesis of 6-methyl-3,7-dinitrononan-4-ol (dinitro alcohol intermediate)

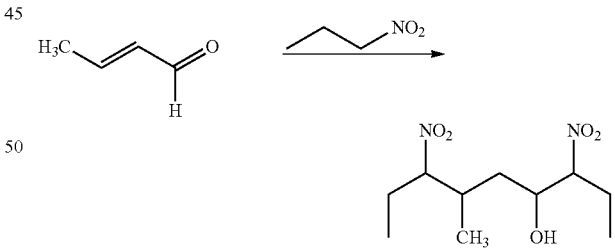

A three neck round bottom flask equipped with a stir bar, thermocouple, dropping funnel capped with nitrogen inlet and condenser was charged with 2-Nitropropane (50 g, 0.56 mols, 5.0 equivalents) and catalytic amount of DBU. The deep yellow solution was mixed under nitrogen for about thirty minutes. To this mixture was added crotonaldehyde (7.9 g, 9.2 mL, 0.112 moles, 1.0 equivalent) drop-wise over a period of twenty minutes. The addition of crotonaldehyde in this case was done at room temperature and during addition, exotherm of about 12° C.-15° C. was observed. After complete addition, the reaction was stirred at room temperature for 6 hours. At this point, GC analysis showed the absence of crotonaldehyde from the mixture. The reaction was let to stir at room temperature overnight and high performance liquid chromatography (HPLC) analysis showed the presence of only two peaks which correspond to 1-NP which was in excess and the desired product (1 CA+2NP adduct). Excess 1-NP was removed by vacuum distillation and the resulting orange viscous liquid was subjected to hydrogenation. This material was about 37.2 g total weight however it still had some 1-NP remaining.

Synthesis of 3,7-diamino-6-methylnonan-4-ol (diamino alcohol intermediate)

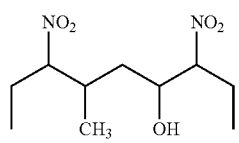
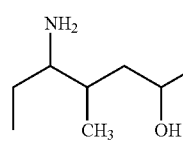

37.2 g of the nitro alcohol above was dissolved in 50 mL methanol and hydrogenated under hydrogen in the autoclave at 60° C., using 14.3 g RaNi 3111 as a catalyst and at 600 psi pressure. After workup which included filtration of the catalyst and removal of methanol, approximately 18 g (64% yield) of the low viscous yellow liquid was obtained. GC-MS analysis confirmed the presence of the desired amino alcohol. CI-MS showed [M+H]=189 and GC showed that purity of the material to be 50%. The rest were low boiling materials. The pKa of the amines was 9.85.

Example 3

Synthesis of 2,6-dimethyl-2,6-dinitro-5-phenylheptan-3-ol (dinitro alcohol intermediate)

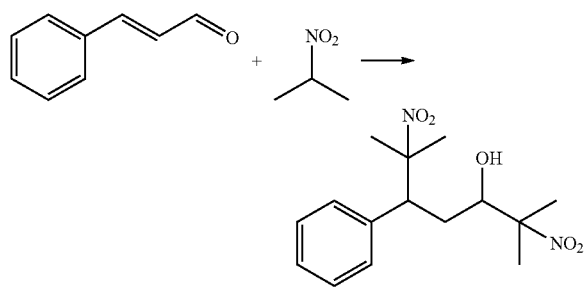

A three neck round bottom flask equipped with a stir bar, thermocouple, dropping funnel capped with nitrogen inlet and condenser was charged with 2-Nitropropane (101.1 g, 1.14 mols, 6.0 equivalents) and catalytic amount of DBU. The yellow solution was mixed under nitrogen for about twenty minutes. To this mixture was added trans-cinnamaldehyde (25.0 g, 0.19 moles, 1.0 equivalent) drop-wise over a period of twenty minutes. During addition of trans-cinnamidehyde to the nitro paraffin, an exotherm of approximately 22° C. was observed. After complete addition, the reaction mixture was heated to 50° C. for 4 h. After the heating time, the mixture was let to cool down slowly to room temperature. When the reaction mixture temperature reached 36.8° C., a pale yellow solid crashed out of the solution. The solid was filtered through a Buchner funnel and washed thoroughly with pentane and ether. The white powder was let to dry under vacuum for 1 hour. The total yield of the desired nitro alcohol was 62% (36 g). NMR showed that the product was >99% pure. $^1$H NMR (CDCl$_3$): ∂ 1.45-2.27 (m, 15H), 3.52-3.54 (m, 1H), 3.67-3.74 (m, 1H), 7.17-7.34 (m, 5H). $^{13}$C NMR (CDCl$_3$): ∂ 20.8, 22.4, 23.2, 25.8, 31.3, 50.3, 72.9, 91.5, 91.6, 128.1, 128.7, 129.4, 136.6 ppm.

Synthesis of 2,6-diamino-2,6-dimethyl-5-phenylheptan-3-ol (diamino alcohol)

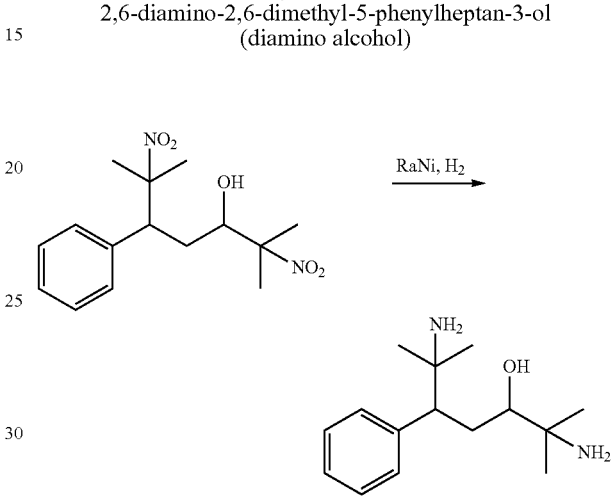

50 g of the nitro alcohol above was dissolved in 300 mL methanol and hydrogenated in the autoclave at 60° C. using 24.3 g RaNi 3111 as a catalyst and at 600 psi pressure. After workup which included filtration of the catalyst and removal of methanol, approximately 40 g (68% yield) of the high viscous pale yellow/colorless liquid was obtained. NMR and GC-MS analysis confirmed the presence of the desired amino alcohol. CI-MS showed [M+H]=251 and GC showed that purity of the material to be 78% straight from the autoclave. The rest of the material seems to be the mono adduct obtained from the reversal of the Henry reaction. The mixture was purified by vacuum distillation and approximately 96.2% purity of the desired material was obtained. The boiling point of the material was approximately 150° C.-160° C. at 5.0 torr. The pKa of the amines was 9.65. The VOC of the material, as determined by modified EPA Method 24, is 4.4%. $^1$H NMR (CDCl$_3$): ∂ 0.91-0.99 (m, 12H), 1.67-1.81 (m, 3H), 2.71-2.76 (m, 2H), 7.08-7.23 (m, 5H). $^{13}$C NMR (CDCl$_3$): ∂ 24.6, 27.9, 28.3, 29.8, 31.6, 51.8, 52.6, 54.2, 75.9, 126.3, 127.8, 129.4, 142.0 ppm.

Volatile Organic Content (VOC).

VOC is measure following modified EPA Method 24. The VOC was measured for the neat amine only and not the fully formulated system. The amines are weighed in a pan and kept in an oven for 1 h at 105-110° C. The percent weight loss is reported as the VOC, corrected for the water content in the sample which can be measured by Karl Fisher Titration.

Example 4

Mineral Slurry 2,6-diamino-2,5,6-trimethylheptan-3-ol prepared in Example 1 was used as a rheology stabilizer for an aqueous kaolin suspension as follows. A control slurry of kaolin was prepared by first mixing water with Dispex N40V (polyacrylate dispersant commercially available from Allied Colloids) in a vessel with an agitator for mixing. To this admixture, dry untreated kaolin pigment was added under agitation to a suitable solids and fluidity level typical of calcined clay slurries as referenced as the Control in the Table below. The test slurries were prepared by utilizing dry kaolin pigment that was first surface treated by simple blending of the pigment in a vessel with the diaminoalcohol. This operation consisted of mixing the kaolin with diaminoalcohol in a vessel which was capped, and placed on a roller mill for 8 hours to allow the diaminoalcohol to adequately treat the surface of the kaolin. The treated calcined clay was then added incrementally to a vessel containing water with agitation. Viscosity values were recorded at 1% incremental dosages of kaolin above 50% solids loading. The data shows that a minimum of 2% increase in solids is obtainable while maintaining the fluidity of the slurry at comparable viscosity.

TABLE performance of CROT-AMP-NH2 in calcined kaolin clay

| | Viscosity, cP, 100 rpm clay solids (wt %) | |
|---|---|---|
| Test | Control (Dispex N40V only) | diamine-treated (no Dispex N40V) |
| 50.0 | 41 | 36 |
| dilatancy vs. control | — | slightly less |
| 51.0 | 46 | 40 |
| 52.0 | 54 | 44 |
| 53.0 | 58 | 50 |
| 54.0 | 64 | 55 |

What is claimed is:

1. A mineral slurry comprising:
   (a) 40 to 55% by weight water;
   (b) 45 to 58% by weight of a solid particulate clay material; and
   (c) present in an effective amount to stabilize at up to 2% by weight of a diamino alcohol compound having the formula:

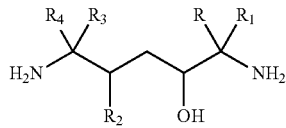

wherein R is independently hydrogen, alkyl, aryl, or —$CH_2OH$; $R_1$ is independently hydrogen, alkyl, or —$CH_2OH$; alternatively, R and $R_1$ may be linked together to form a cycloalkyl; $R_2$ is independently hydrogen, methyl, alkyl, phenyl $R_3$ is independently hydrogen, alkyl, phenyl phenyl, or —$CH_2OH$; $R_4$ is independently hydrogen, alkyl, or —$CH_2OH$; and alternatively, $R_3$ and $R_4$ may be linked together to form a cycloalkyl; and wherein all weight percents are based on the total weight of the mineral slurry.

2. The mineral slurry according to claim 1, wherein the clay comprises kaolin clay.

3. The mineral slurry according to claim 1, wherein R, $R_1$, $R_2$, $R_3$ and $R_4$ are each methyl.

4. The mineral slurry according to claim 1, wherein R, $R_1$, $R_3$ and $R_4$ are each methyl, $R_2$ is phenyl.

5. A method for preparing a mineral slurry having greater than 50% by weight solids content, based on the total weight of the mineral slurry, said method comprising combining:
   (a) 40 to 55% by weight water;
   (b) 45 to 58% by weight of a solid particulate clay material; and
   (c) present in an effective amount to stabilize at up to 2% by weight of a diamino alcohol compound having the formula:

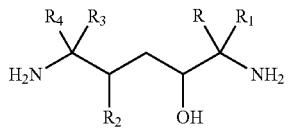

wherein R is independently hydrogen, alkyl, aryl, or —$CH_2OH$; $R_1$ is independently hydrogen, alkyl, or —$CH_2OH$; alternatively, R and $R_1$ may be linked together to form a cycloalkyl; $R_2$ is independently hydrogen, methyl, alkyl, phenyl $R_3$ is independently hydrogen, alkyl, phenyl phenyl, or —$CH_2OH$; $R_4$ is independently hydrogen, alkyl, or —$CH_2OH$; and alternatively, $R_3$ and $R_4$ may be linked together to form a cycloalkyl; and wherein all weight percents are based on the total weight of the mineral slurry.

6. The method according to claim 5, wherein R, $R_1$, $R_3$ and $R_4$ are each methyl and $R_2$ is hydrogen.

7. The method according to claim 5, wherein R, $R_1$, $R_3$ and $R_4$ are each methyl, $R_2$ is phenyl.

* * * * *